United States Patent [19]

Kay et al.

[11] Patent Number: 4,691,288
[45] Date of Patent: Sep. 1, 1987

[54] TORQUE SENSOR FOR INTERNAL-COMBUSTION ENGINE

[75] Inventors: Ira W. Kay, Tolland; Ronald P. C. Lehrach, Glastonbury, both of Conn.

[73] Assignee: United Technologies Corporation, Hartford, Conn.

[21] Appl. No.: 713,153

[22] Filed: Mar. 18, 1985

[51] Int. Cl.⁴ ............... G01M 15/00; G06F 15/32; G01L 3/00
[52] U.S. Cl. .................................. 364/511; 73/116; 73/862.19; 73/862.33; 364/431.01
[58] Field of Search ............... 364/508, 511, 431.01; 73/116, 117, 117.3, 862.19, 862.33

[56] References Cited

U.S. PATENT DOCUMENTS

| | | | |
|---|---|---|---|
| 3,921,446 | 11/1975 | Ludloff | 73/862.19 |
| 4,064,747 | 12/1977 | Rackliffe et al. | 73/116 |
| 4,169,371 | 10/1979 | Witschi et al. | 73/116 |
| 4,301,678 | 11/1981 | Full et al. | 73/116 |
| 4,532,798 | 8/1985 | Kohama et al. | 73/116 |
| 4,550,595 | 11/1985 | Venema | 73/116 |

OTHER PUBLICATIONS

Fleming: Automotive Torque Measurement: A Summary of Seven Different Methods, IEEE Transactions on Vehicular Technology, vol. VT-31, No. 3, Aug. 1982, pp. 117–124.

*Primary Examiner*—Felix D. Gruber
*Attorney, Agent, or Firm*—Stephen A. Schneeberger

[57] ABSTRACT

A method and apparatus for providing a signal representative of the output torque of an internal combustion engine utilizes a correlation of average engine speed and variations in instantaneous sub-cyclic engine speed. The variations in instantaneous sub-cyclic engine speed involves a measure of the difference in those instantaneous speeds occuring at a pair of crank angles in each firing interval of an engine cycle, each crank angle of the pair being separated from the other by substantially one-half of the firing interval. The pair of crank angles in each firing interval across which the instantaneous speed difference is measured preferably are the middle of the interval and either the beginning or the end of the interval. The measured valves of instantaneous engine speed may be adjusted to remove the effects of transient changes not related to the individual cylinder firings.

17 Claims, 9 Drawing Figures

TORQUE SENSOR FOR INTERNAL-COMBUSTION ENGINE

The Government has rights in this invention, pursuant to Contract No. DAAE07-82-C-4093 awarded by the U.S. Army.

TECHNICAL FIELD

This invention relates to a torque sensor and more particularly to torque-sensing circuitry for use with an internal-combustion (IC) engine. More particularly still, the invention relates to a method and apparatus for providing an indication of the torque of an IC engine.

BACKGROUND ART

In the control of internal-combustion engines, systems are being provided in which the fuel-quantity control is intended to provide a requisite engine torque as a function of engine speed and accelerator pedal position. More specifically, a torque map is stored in memory as a function of engine speed and accelerator position for thereby regulating fuel quantity with the intent of providing the requisite torque. While such a system may function well for a given set of engine operating conditions, variables such as engine wear and fuel characteristics can interfere with the proper functioning of the system. For instance, with increasing investigation being placed upon the use of alternative fuels for powering internal-combustion engines, it is possible for the energy-producing characteristics of various fuels to differ greatly. Assuming the torque map for an engine is developed using a specific fuel as a standard, some alternative fuel may deliver substantially less energy for the same volumetric quantity of fuel delivered. While it might be possible to compensate for such variations by requiring the vehicle operator to adjust the positioning of an accelerator pedal, it is preferable that a particular accelerator-pedal position be capable of delivering a predetermined level of torque at a certain speed to afford repeatability to the operator and the vehicle. To accomodate the aforementioned need, it is contemplated that a signal indicative of actual engine torque might be compared with desired values of torque and the difference used as an adjustment or compensation factor in a fuel-quantity control loop. Of course, the provision of such an actual torque signal may have additional utility as well for the performance of other engine control and/or diagnostic functions.

Although commercial-available torque transducers do exist and at least theoretically might be used for obtaining a direct measurement of the output torque of an internal combustion engine, their actual use for so-called "on-line" or "on-board" measurement of torque would normally be precluded by cost and/or by packaging considerations. Such torque sensing units usually require separate shaft members and/or slip-ring couplings or rotary transformers for transmission of excitation and output signals from the rotating shaft and are thereby not readily adaptable to existing engine/transmission configurations.

Various techniques have been developed for providing some measure of engine torque using values derived from sensed measurements of engine speed. While these systems may avoid some of the aforementioned shortcomings associated with sensors which detect torque directly, they also possess their own limitations. For instance, in U.S. Pat. No. 4,169,371 to Witschi et al there is disclosed an arrangement for determining the torque of a drive system in dynamic operation, however, that system relies upon the acceleration speed of an unloaded engine and is of value principally for diagnostic and/or analytical purposes.

A more recent patent, U.S. Pat. No. 4,301,678 to Full et al and assigned to the assignee of the present application, discloses an analytical and diagnostic system for determining relative power contributions of each cylinder in an internal-combustion engine. That system is designed for use with an engine which is undergoing tests and is connected to a load such as a dynamometer. Firstly, it senses sub-cyclic speed fluctuations at both the engine and the load. Those sub-cyclic speed fluctuations are used to develop respective sub-cyclic torque signals for the engine is the load. A net sub-cyclic torque signal is then developed by determining the difference between the two aforementioned sub-cyclic torque signals. Sub-cyclic fluctuations in the net-torque signals are identified and compared to provide signal indications of the relative power contribution between cylinders. Although such system is advantageous for determining the relative health or torque contributions of the respective cylinders in an engine, it does not provide an engine torque signal which is suited to the continuous on-line control of the engine.

DISCLOSURE OF INVENTION

Accordingly, it is a principal object of the present invention to provide an improved method and apparatus for providing a signal which serves as a measure of the torque of an internal-combustion engine. Included within this object is the provision of such method and apparatus for providing a torque signal suitable for continuous control, as for on-board control of an engine in a vehicle. Further included in this object is the provision of such method and apparatus for providing a torque signal in a manner which is of relatively low cost and facilitates its on-board utilization in vehicles powered by internal-combustion engines.

In accordance with the present invention there is provided an on-board, on-line method and apparatus for providing a signal which is a substantially accurate measure of engine torque during a variety of load conditions and while operating under normal conditions, such as on the road. The torque measure, or signal, is provided via a correlation of measured sub-cyclic crankshaft or flywheel speed variations. Sub-cyclic speed variations, or perturbations, result from local angular accelerations and decelerations induced by the periodic, impulsive sub-cycle torque contributions of the individual cylinders of the engine. Instantaneous incremental speeds, $N_i$, of the flywheel or crankshaft occurring at various points in the sub-cycles within a complete engine cycle may be determined in a known manner by measuring the time interval between a pair of successive teeth or reference marks of known, typically small, angular separation on the flywheel and converting that time measurement to an appropriate value of rotational speed.

In accordance with the invention it has been determined that the delivered torque, T, of the engine may be described or provided by a correlation which employs the mean speed of the engine, $N_{avg}$, and a sub-cyclic speed difference parameter $\Delta N_i$, both typically averaged over one or more full cycles of the engine. This sub-cyclic speed difference parameter involves the determination of a difference between the instantaneous engine (flywheel) or crankshaft) speeds, $N_i$, at respective pairs of points i.e., crankshaft angles, in each of the cylinder firing intervals, the points in a pair being spaced from one another by approximately one-half of the firing interval. More specifically, those differences in instantaneous speeds are typically measured between the middle and either the beginning or the end of each of the cylinder firing intervals. A cylinder firing interval represents the total engine cycle time or angle, divided by the number of cylinders. The firing intervals are in fixed angular relation to the engine operating cycle. The instantaneous speed measurements may be adjusted for each sub-cycle of engine operation to accommodate overall transient as well as steady-state engine operating conditions with a single correlation.

A specific torque correlation in accordance with the invention is of the form $T = aN_{avg} + b\Delta N_i + c(N_{avg})^2(\Delta N_i) + d$ with a general relationship being expressed as $T = aN_i + b\Delta N_i + c(N_{avg})^2 + d(\Delta N_i)^2 + e(N_{avg})(\Delta N) + f$. In each expression, T represents the torque, $N_{avg}$ represents the average engine speed for an engine cycle and $\Delta N_i$ represents the difference, or more specifically an average of the difference, between instantaneous sub-cyclic engine speeds, $N_i$, at the two crank angles of each pair of half-interval spaced crank angles per firing interval within an engine cycle. The requisite engine average speed and instantaneous sub-cyclic signals and the subsequent calculation of torque in accordance with the aforementioned correlation is conveniently provided by sensors for detecting crankshaft rotation and signal processing circuitry, such as a microprocessor, which respond in accordance with the correlation.

BEST MODE FOR CARRYING OUT THE INVENTION

Figure 1:
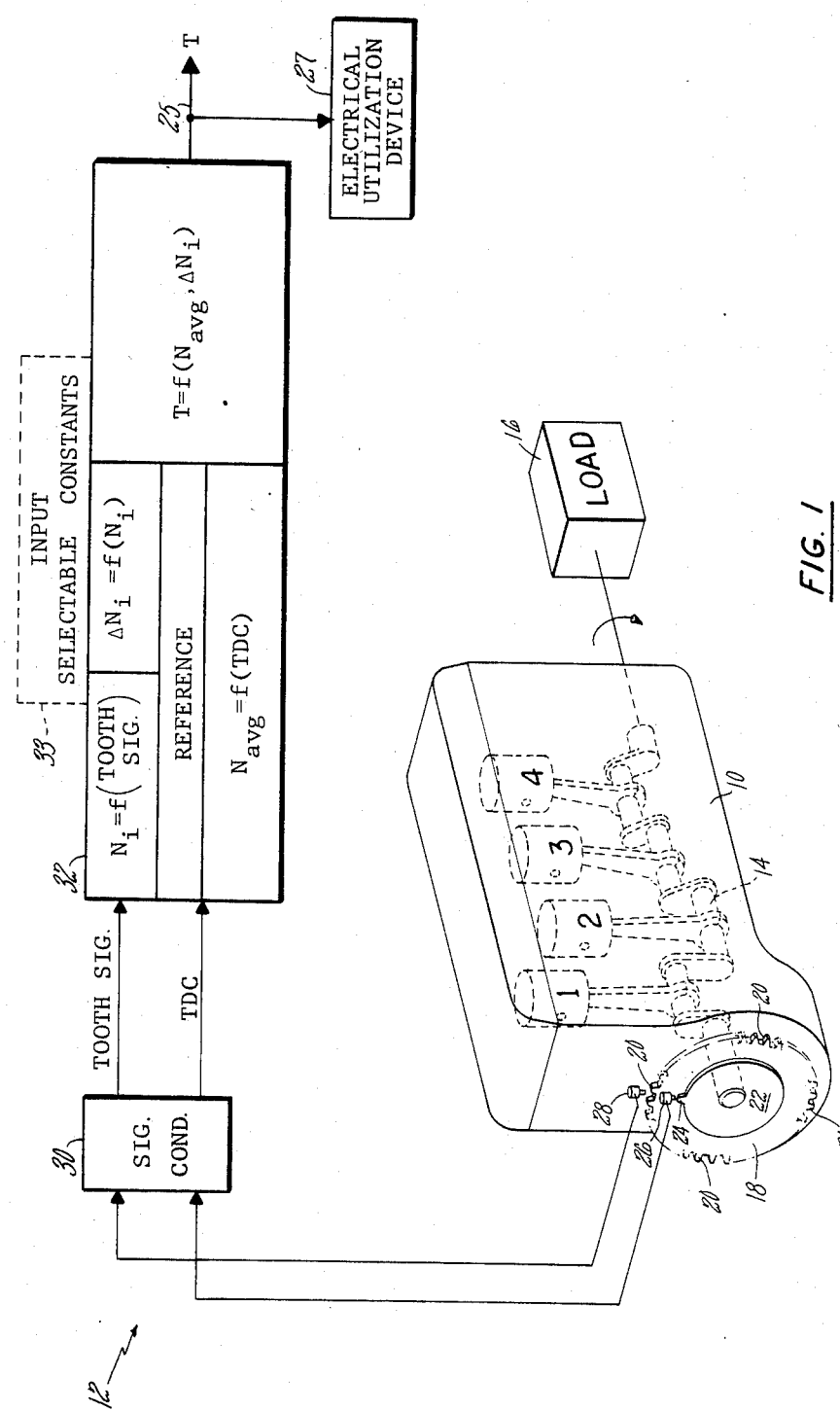
FIG. 1 is a generalized schematic block diagram illustration of the torque-measuring apparatus of the invention in operative association with an internal combustion engine.

Referring to FIG. 1 there is illustrated, in simplified schematic block diagram form, an internal combustion engine 10 having the torque measuring apparatus 12 of the invention disposed in operative association therewith. For purposes of the described embodiment, engine 10 will be presumed to be a four-cylinder, four-cycle compression ignition (diesel) engine, however, it will be understood that the torque measuring apparatus 12 is similarly applicable to spark-ignited engines, two-cycle engines, and engines having a greater or lesser number of cylinders, including an odd number. Engine 10 includes a conventional crankshaft 14 to which are connected the pistons associated with the respective cylinders 1, 2, 3 and 4. Engine 10 is illustrated as being connected to a load 16 which, in the normal instance, will comprise the remainder of the drive train of a vehicle, so as to denote usage of the invention during normal operation of a vehicle such as an automobile. The load 16 may also represent a dynamometer used during the performance mapping for a particular model of engine, as will be explained.

For purposes of descriptive convenience, the engine's flywheel 18 is illustrated as being affixed to the crankshaft 14 at the opposite end of engine 10 from load 16. The flywheel 18 conventionally includes a ring gear provided with a number of precision-machined gear teeth 20 equally-spaced around the circumference of the ring gear so that the tooth-to-tooth intervals define substantially equal increments of crankshaft angle. A supplemental member or disc 22 is illustrated as being affixed to rotate with flywheel 18 for the purpose of providing a crankshaft index indication, as for instance by the singular tooth 24 representative of the top dead center position (TDC) of the number 1 cylinder. In certain instances to be hereinafter discussed, it may be necessary to precisely identify the TDC position of the number 1 cylinder during its power stroke. Since tooth 24 is representative of that position only once every other revolution of crankshaft 14, it may be necessary to provide additional or alternative means for identifying that orientation. In a spark-ignited engine, such indication may be afforded by sparkplug firing in the number 1 cylinder in conjunction with the positioning of TDC tooth 24. In a compression-ignition engine, that indication may be provided by a pressure or combustion sensor in the number 1 cylinder or by a reference indicator which makes only one rotation during a complete engine cycle, as for instance a cam shaft or more likely some portion of the fuel pump.

As will be hereinafter described in greater detail, the torque measuring apparatus 12 is capable of providing a substantially continuous output signal T, represented on line 25, which is an accurate measure of the output torque of engine 10 during substantially all normal operating conditions of the engine in a vehicle and while operating on the road. Signal T may be connected as an input to an electrical utilization device 27. Torque measuring apparatus 12 includes a suitable detector or sensor 26 for detecting passage of the TDC tooth 24 and a suitable detector or sensor 28 for detecting passage of the respective teeth 20. Sensors 26 and 28 are of a magnetic-type in the illustrated embodiment, however, it will be appreciated that other forms of sensors are equally applicable. The electrical signals provided by sensors 26 and 28 are extended to signal-conditioning circuitry 30 and thence to signal processing circuitry 32 which operates to provide the output torque signal T as a result of a correlation of sub-cycle speed variations of engine 10 in accordance with the invention.

It has been determined that an accurate measure of torque may be provided via a unique correlation of variables associated with engine speed and specifically engine sub-cycle speed. As used herein, the term "engine cycle" will refer to a complete engine cycle and, when referenced to rotation of crankshaft 14 or flywheel 18 will comprise 720° of revolution in the four-cycle engine 10. The term "sub-cycle" will refer to those cycles of engine speed variation (acceleration/deceleration) which occur within an engine cycle and are the result of the impulsive torque contributions of the individual cylinders of the engine.

The term "firing interval" refers to an interval within an engine cycle during which a particular cylinder is contributing to the output torque of the engine. The number of firing intervals within an engine cycle is determined by the number of engine cylinders and whether the engine is of two or four-cycle type. For instance, in a four-cylinder, four-cycle engine, each firing interval will have a duration of 180° of crank angle, there being four successive such intervals within the full 720° crank angle interval of a full engine cycle. The firing interval $$FI = 180° \times (S_c/N_c)$$

where $S_c$ is equal to the number of piston strokes per cycle (i.e., two or four) and $N_c$ represents the number of engine cylinders. This presumes that no two cylinders are operating in unison. Importantly, for a particular engine each firing interval has a constant angular relationship to the TDC reference position of the number 1 cylinder, irrespective of changes in engine operating conditions. In the illustrated embodiment, the start of the first interval is presumed to coincide with TDC of the number 1 cylinder at the beginning of its power stroke.

The term "instantaneous sub-cyclic engine speed" refers to the instantaneous speed of the engine, as for instance measured at the flywheel by measuring the time required for two closely-spaced (i.e., adjacent) teeth 20 to pass detector 28. Because the angular spacing of adjacent teeth 20 is known, the time for such passage represents an instantaneous angular speed. Accordingly, instantaneous flywheel speed signals may be provided in a known manner by using the signals provided by a pair of adjacent teeth 20 passing the detector 28 to respectively enable and disable a counter which is being clocked at a known frequency. The resultant count of the counter corresponds with a measurement of time and accordingly may be translated to a measurement of angular speed.

Using the foregoing technique to obtain or calculate values of instantaneous sub-cyclic engine speed for each of a variety of data points respectively associated with the intervals between successively adjacent teeth 20 on the flywheel 18, it is possible to determine and graphically depict the variations in instantaneous speed and thereby depict the sub-cycles of engine speed. Through use of the timing information afforded by passage of the tooth 24 by the TDC detector 26, it is also possible in a known manner to reference the instantaneous sub-cyclic speed data to the angular position of crankshaft 14 and flywheel 18. The angular position of an instantaneous speed typically bisects the two crank angles of the respective two teeth 20 used to measure that speed.

Figure 2A:
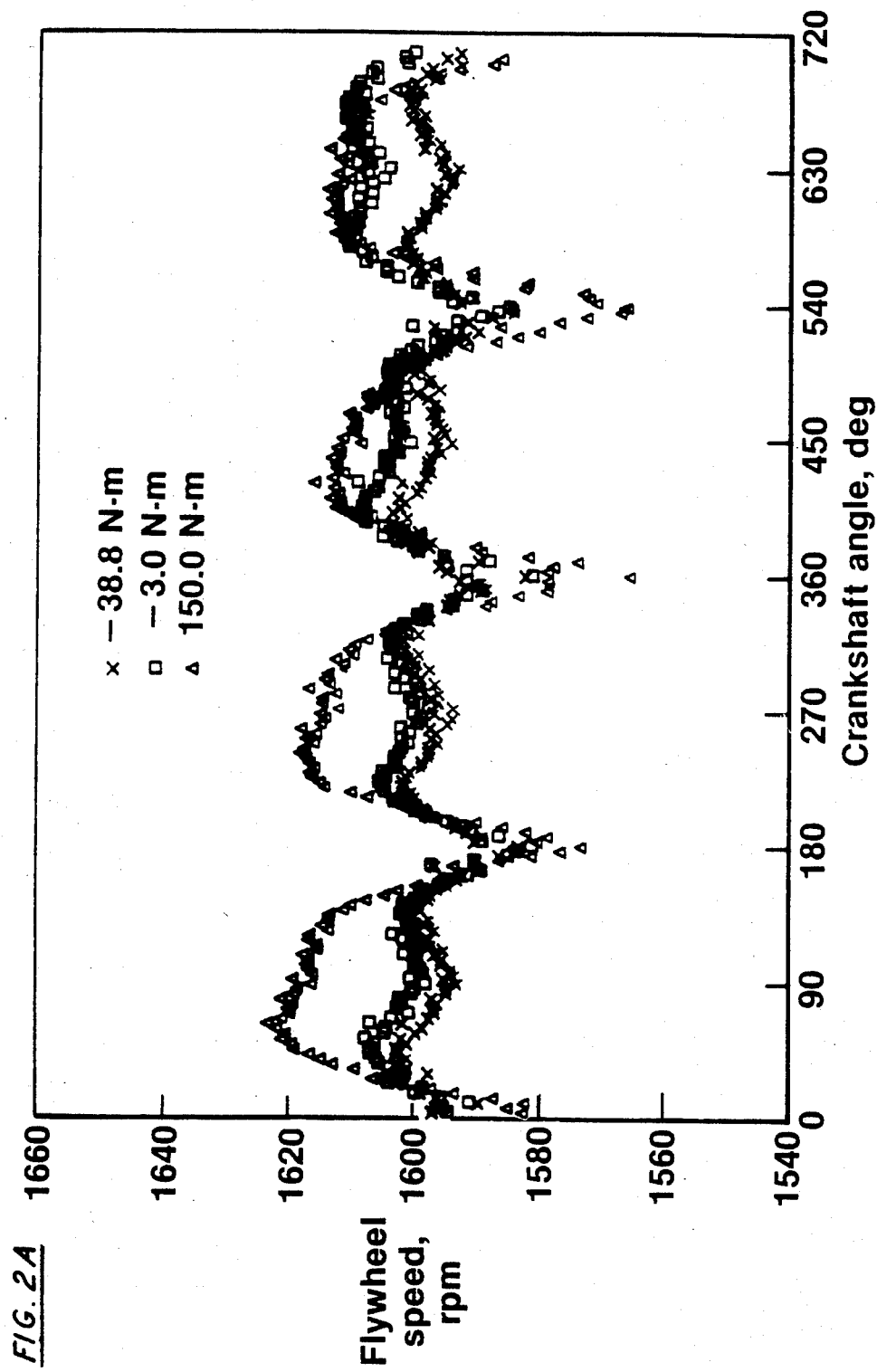
FIGS. 2A, 2B and 2C depict the effect of load on sub-cyclic engine speed variation at 1600 rpm, 2200 rpm and 3000 rpm, respectively.
Figure 3:
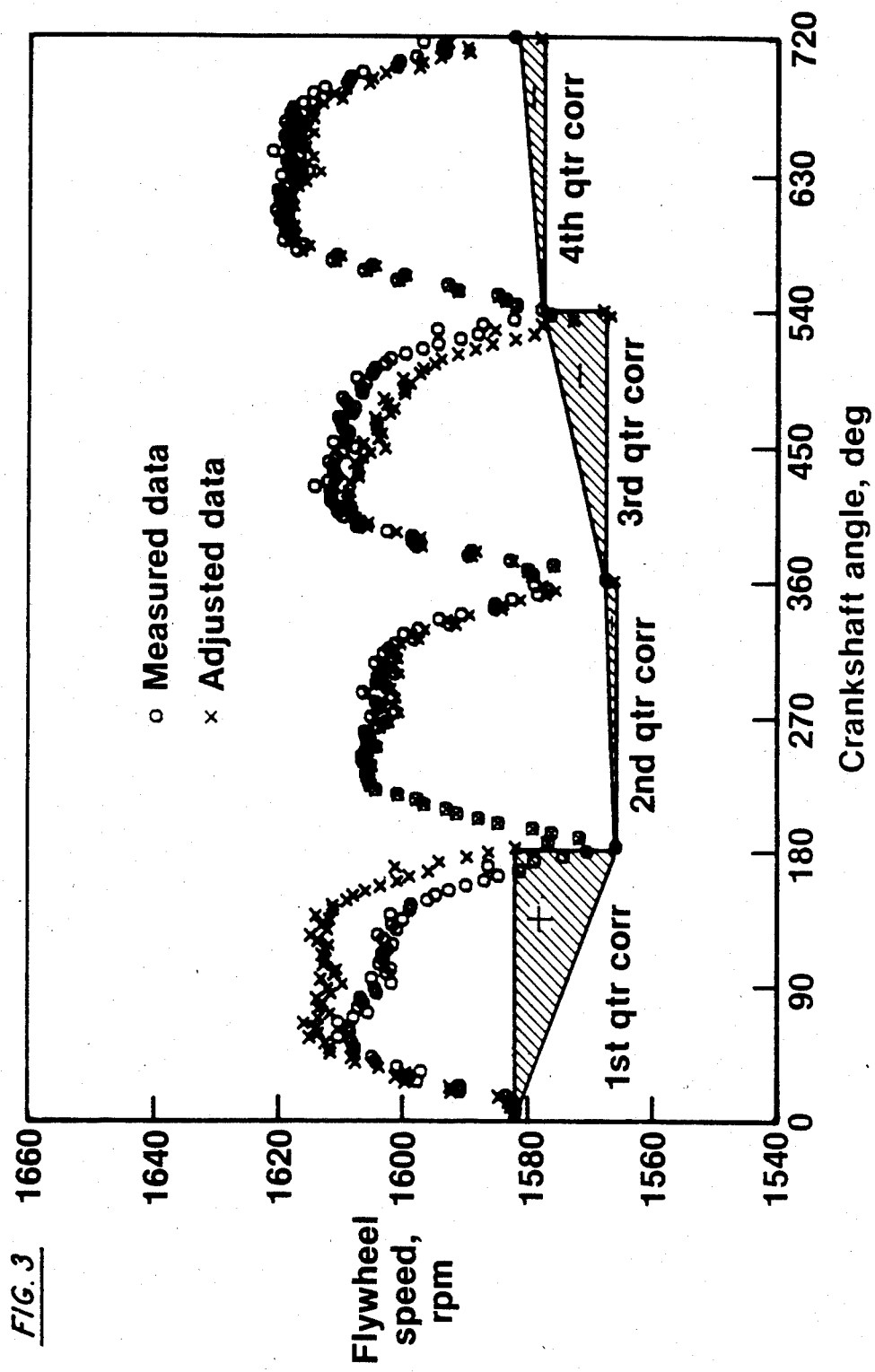
FIG. 3 is an illustration of a plot of sub-cyclic engine speed data, both as measured and as adjusted to remove the effects of overall engine acceleration.

The data of FIGS. 2A, B and C, obtained by operating an engine on a dynamometer, graphically depict the effect of load on instantaneous speed variation at mean engine speeds of approximately 1600 rpm, 2200 rpm and 3000 rpm, respectively. The data depicted in FIGS. 2A, B and C include the effects of overall engine accelerations or decelerations and/or the relatively low frequency variations of flywheel speed that occur as a result of the coupling between the engine and the load. FIG. 3 graphically depicts the procedure for adjusting the raw instantaneous speed data to obtain adjusted instantaneous speed data. That adjustment was made to ensure that the speed-perturbation-characterizing parameters describe only those speed variations directly related to the individual cylinder firings.

Referring to FIG. 3, the adjustment procedure involves proportionally changing each of the instantaneous speed measurements in a given firing interval to values that would have existed in the absence of the gross engine accelerations/declerations and/or low-frequency drive line effects. This adjustment is based on the presumption that, under steady-state operating conditions, the flywheel speed at the end of each firing interval should be the same as at the beginning of that interval, though not necessarily a minimum. Accordingly, the instantaneous speed data point at the beginning of a particular firing interval is presumed to be the reference, and any variation from that speed represented by the instantaneous speed of the final data point at the end of that particular firing interval provides the basis for proportionately adjusting the remainder of the measured raw data points. Specifically, as illustrated in the first firing interval of FIG. 3, if the final measured speed data point of that firing interval is approximately 16 rpm less than that of the first data point, it is necessary to adjust that final data point upwardly in speed by approximately 16 rpm. The other data points will be adjusted upwardly in a proportional manner, or in other words, the raw instantaneous speed datum at the 90° mid-point of the interval will be increased by approximately 8 rpm. This results in a plot of the adjusted speed data in which the beginning and end speed datum points are at substantially the same flywheel speed, with the intermediate data adjusted proportionally. By reference to the second firing interval depicted in FIG. 3, it will be observed that such adjustment to the measured instantaneous speed may be made downwardly, as well as upwardly. It will also be noticed that the speed datum for the beginning point of the second firing interval serves as the reference for that interval and corresponds with the measured datum rather than the datum adjusted at the end of the first interval immediately preceeding.

Through use of instantaneous speed data developed and adjusted in the manner described in connection with FIGS. 2A, B and C and FIG. 3, it has been possible to correlate directly-measured, time-averaged values of output torque against the measured (and adjusted) cyclical engine flywheel speed variations. Both the data depicted in FIGS. 2A, B and C and the directly-measured values of torque were determined in a test setting in which the engine 10 was connected to a dynamometer and a fast-response, strain-gauge-type torque meter was used. Attempts to correlate the directly-measured torque with the speed data via either (1) a maximum-minus-minimum flywheel speed difference for each of the individual cylinder firings, or (2) a root-mean-square average deviation on the individual flywheel speed measurements about the mean for each of the cylinder firings failed to provide the desired accuracy, particularly at the higher engine speeds of 2200 and 3000 rpm. In that speed range, those attempted correlations exhibited the strongly undesirable features of producing either ambiguous double values of torque or poorly defined imprecise values of torque for a given measured level of the standard deviation of the flywheel speed variation.

Examination of the flywheel speed variations depicted in FIGS. 2A, B and C reveals that as the engine speed is increased, a smooth transition in the shape of the instantaneous speed versus crankshaft angle relationship occurs and is characterized by a systematic decrease of instantaneous flywheel speeds (relative to the mean speed) at crankshaft angles of 90°, 270°, 450° and 630° corresponding to the mid-points of the respective firing intervals for the four-cylinder engine. However, the fact that the mid-interval instantaneous values of flywheel speed still exhibit a systematic variation with engine load at a given speed suggests that an alternative parameter describing the average adjusted mid-interval minus end (or equivalently, beginning)-interval instantaneous flywheel speed difference will correlate more consistently with engine torque over the entire range of speeds and loads.

Figure 5:
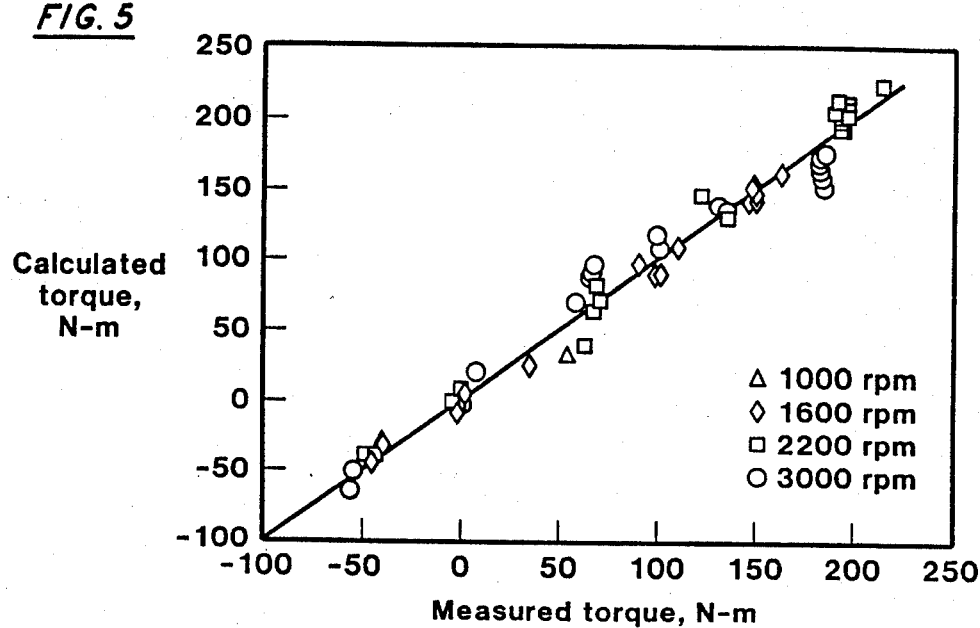
FIG. 5 graphically depicts a regression of the correlation depicted in FIG. 4.
Figure 4:
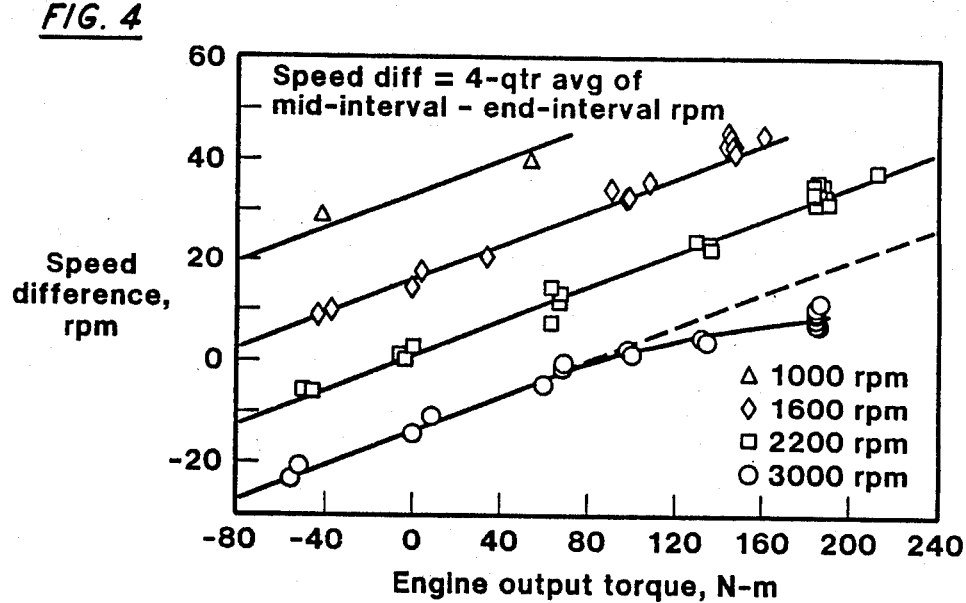
FIG. 4 graphically depicts the flywheel, speed-torque correlation in accordance with the invention.

Such a correlation is depicted in FIG. 4 where it can be seen that a very systematic relationship does exist among the correlated 90° flywheel speed difference, load, and speed and that the variations of the flywheel speed difference are approximately linearly related to both load and speed over most of the operating envelope. Application of multiple linear regression analysis to the data of FIG. 4 further results in an excellent data fit of the form torque $T=aN_{avg}+b\Delta N_i+c(N_{avg})^2(-\Delta N_i)+d$, where $N_{avg}$ represents average engine speed over one or more full engine cycles and $\Delta N_i$ represents an average of the difference between instantaneous speeds $N_i$ at mid-interval and either the beginning or the end of each of the respective firing intervals for the several firing intervals in the engine cycle. The non-linear term is included primarily to account for the data in the high speed, high-load corner of the operating envelope, depicted toward the lower right in FIG. 4. The regressed torque correlation set forth above is depicted in FIG. 5, where the standard deviation for the multipoint data set is only ±11.0N-m (or approximately ±5% of the rated load of the engine) and the statistical coefficient of determination, $R^2$, has a relatively high value of 0.983. A more general expression for the foregoing correlation may be represented as $T=aN_{avg}+b\cdot\Delta N_i+c(N_{avg})^2+d(\Delta N_i)^2+e(N_{avg})(\Delta N_i)+f$. It will be appreciated that the more general correlation form would be expected to apply to a wide class of engines; in fact, application of the more general form to the data of FIG. 4 yielded approximately the same level of accuracy as that corresponding to the specific correlation of FIG. 5.

In view of the foregoing, it is thus possible to provide a signal which is a substantially accurate measure of engine output torque derived solely from values of engine speed. More specifically, those values include engine speed, $N_{avg}$, averaged over one or more full engine cycles and the difference of adjusted instantaneous sub-cyclic engine speeds, $\Delta N_i$, taken within a firing interval and angularly spaced by approximately one-half of that firing interval (i.e., mid to either beginning or end), and averaged for at least the several sub-cycles which constitute a full engine cycle. Thus, to employ the aforementioned correlation as a means for providing the torque signal, T, which may be used to control engine operations and/or to provide diagnostic information, it is only necessary that the torque-measuring apparatus 12 of FIG. 1, including processor 32, be capable of determining the average speed, $N_{avg}$, of the engine, as well as its instantaneous speed, $N_i$, at each of several particular angular positions within an engine operating cycle. The instantaneous speed values, $N_i$, are processed to provide values of averaged instantaneous speed differentials $\Delta N_i$, which, with $N_{avg}$, are used in the aforementioned correlation to provide the torque signal.

Figure 2B:
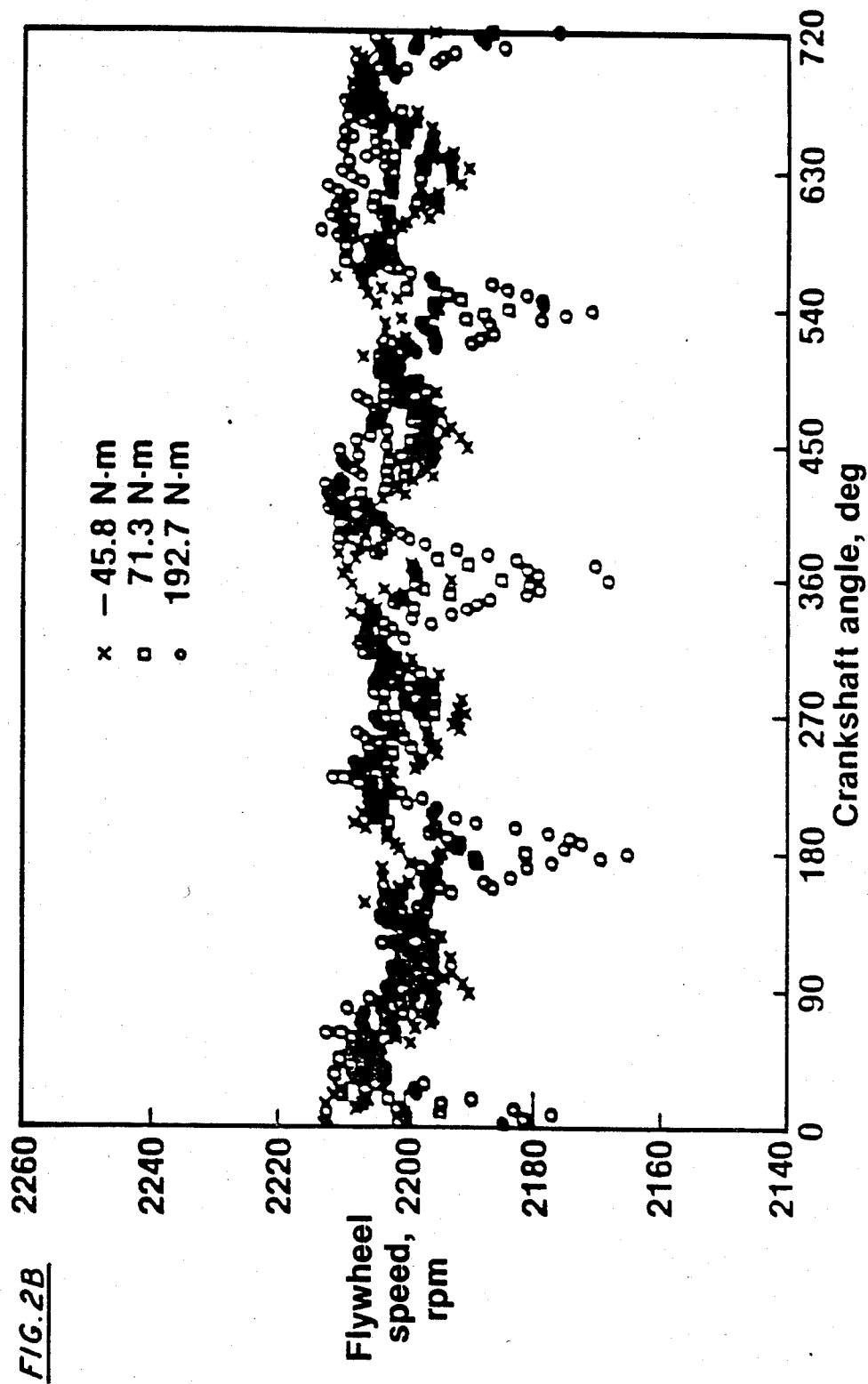
Figure 2C:
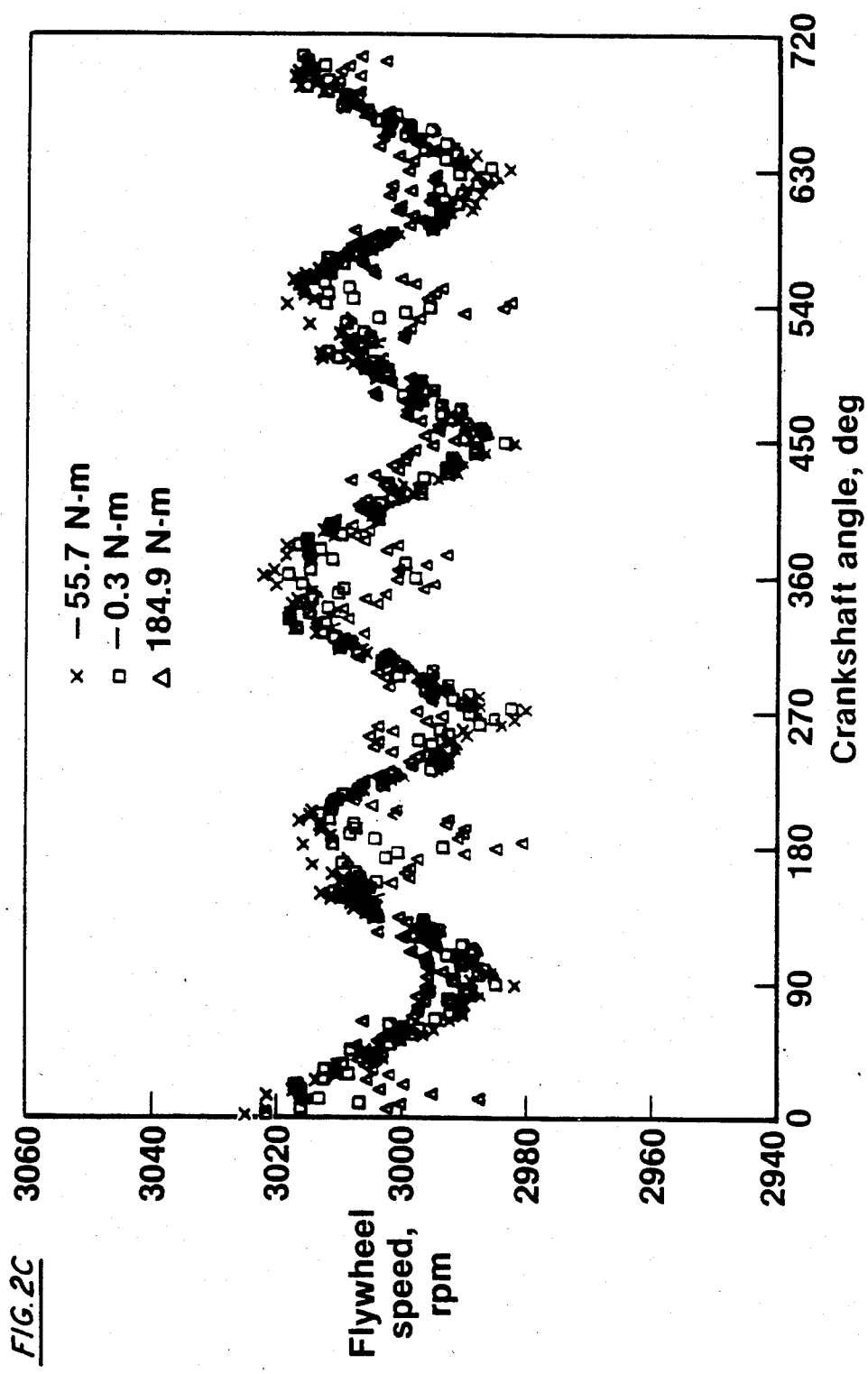

It will be understood that the process of determining the relatively large quantity of instantaneous speed data depicted in FIGS. 2A, 2B, 2C and as represented in FIG. 3 is done for a representative engine of an engine model to establish the various constants associated with the variables in the torque correlation for that engine model. Those data points may be obtained by determining instantaneous velocities of a flywheel for each of some 60-120 positions per revolution of the flywheel. In that way specific data is provided for each 3-6 degrees of engine rotation and intermediate data points may be determined by interpolation. However, to practice the invention during normal operation of an engine in a vehicle, it is only necessary to determine the average speed and those instantaneous speeds required to determine the requisite speed differential for use in the aforementioned correlation.

Accordingly, in the four-cylinder, four-cycle engine 10 under consideration, only nine instantaneous speeds need to be determined for a complete engine cycle those instantaneous speeds occuring at fixed angular positions within a full (720°) engine cycle and at intervals corresponding with one-half of a firing interval, i.e. at 90° intervals. More specifically, it is particularly appropriate and convenient to obtain those data at the beginning, mid and end points of each of the 180° firing intervals in the engine 10. Thus, for the illustrated engine 10, instantaneous speed data need be obtained only at crankshaft angles corresponding with 0°, 90°, 180°, 270°, 360°, 450°, 540°, 630° and 720°. This data may be obtained by using a conventional flywheel 18 having a relatively large number, i.e. 60-120 evenly spaced teeth 20 and measuring the instantaneous speeds only between those four pairs of teeth which are most closely associated with the crank angle positions 0°, 90°, 180° and 270° respectively. A reference signal is provided by TDC mark 24 such that the angular position of the teeth 20 may be determined relative thereto. By reference to the TDC marker 24, a time counter may be enabled during the passage of a relevant pair of adjacent teeth 20 which bracket a relevant crank angle, thereby to determine the instantaneous speed for that crank angle. Correspondingly, the next "n" teeth 20 may be counted before reenabling the time counter for the next relevant pair of teeth 20 at the next relevant angle in the engine cycle. Alternatively, the ring gear on flywheel 18 may be modified such that the only teeth 20 appearing thereon are those which immediately bracket the relevant angles for instantaneous speed measurement, and the other teeth are omitted. Such arrangement would avoid the need to count the teeth between successive crank angles of interest and would assume that each closely spaced pair of teeth 20 would bracket a respective one of the relevant crank angles at which instantaneous speed determinations are to be made.

Figure 6:
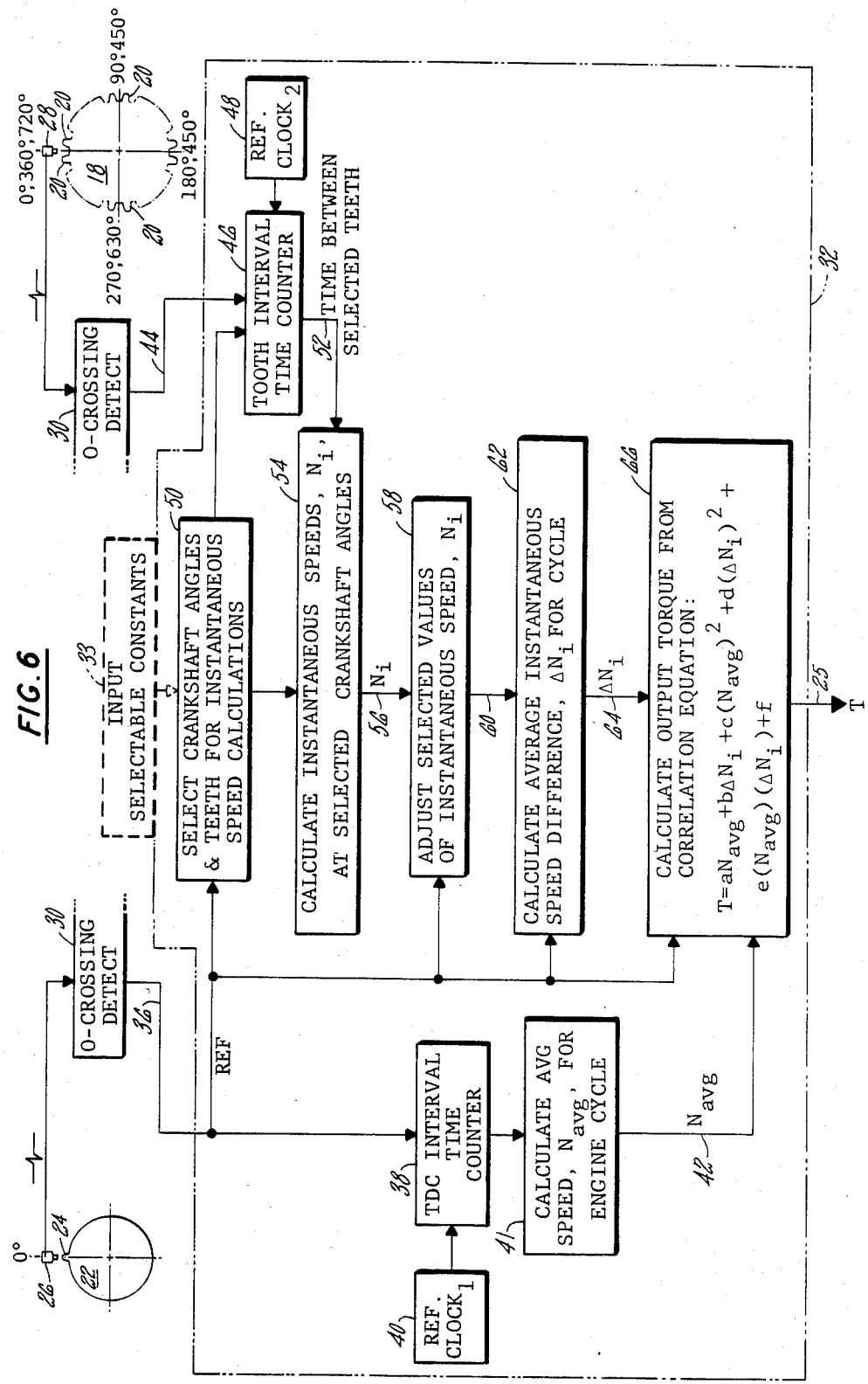
FIG. 6 is a functional block diagram, showing the torque measuring apparatus of FIG. 1 in conjunction with a generalized functional flow.

Referring to FIG. 6, the torque measuring apparatus 12 of FIG. 1 is illustrated in greater detail through use of a functional flow block diagram. Each of the detectors 26, 28 responds to the passage of a reference mark or tooth 24, 20 respectively by providing a brief oscillating waveform which passes through zero potential substantially at the mid-point of the mark or tooth which is to be detected. Correspondingly, respective zero-crossing detectors 30 provide standardized output pulses which indicate precisely when the center of a mark 24 or tooth 20 passes the respective detector 26, 28. The output signals from the detectors 30 indicate their respective events and serve as the respective inputs to signal processing circuitry 32.

Circuitry 32 typically includes a suitably-programmed digital microprocessor or microcomputer with attendant I/O capability and memory, including a RAM and a ROM and/or PROM. The portion of signal processing circuitry 32 contained within dotted block 33 and designated as INPUT SELECTABLE CONSTANTS refers to optional input devices such as thumbwheel switches and the like, for selectably presetting certain values employed in processor 32. Those values may include the number of cylinders within the engine, the number of teeth on the ring gear of the flywheel, the number of engine cycles for averaging, and the various coefficients associated with the torque correlation and typically predetermined by empirical testing of an engine in the manner described with reference to FIGS. 2A, B and C, 3 and 4. On the other hand, if the signal processor 32 and associated memory and program are intended for application only with a single engine model, those values may all be predetermined at the time of manufacture and prestored in the processor's memory such that the need for adjustable inputs via block 33 may be obviated.

The output from the zero-crossing detector 30 associated with the TDC detector 26 is extended to the signal processor 32, as represented by line 36. This signal occurs once each revolution of the engine and serves as the reference, REF, for determining crankshaft angular positions and the completion of one full revolution of the crankshaft and, upon two such revolutions, the completion of a full engine cycle. As earlier mentioned, if it is necessary to reference operation to the TDC position of crankshaft 14 for the number 1 cylinder at the start of its power stroke, a further reference angle input (not shown) may be required. This requirement would arise in four-cycle engines having an odd number of cylinders because then the TDC indicator would not always necessarily coincide with a fixed point, i.e., the beginning, in a firing interval. The TDC signal is extended to a TDC INTERVAL TIME COUNTER 38 which is stepped at a known frequency determined by REFERENCE CLOCK$_1$ at block 40, which may typically be several hundred KHz. The count registered by the counter 38 between successive occurrences of the TDC pulse is a measure of average engine speed for one revolution of the crankshaft, however it is generally preferred to determine the average speed $N_{avg}$ for one full engine cycle and accordingly, counter 38 is allowed to count for two full revolutions of the flywheel 22. The engine speed $N_{avg}$ for one engine cycle may then be calculated in a known manner, as represented at block 41. The resulting signal, $N_{avg}$, is represented as appearing on line 42. While it is preferable that $N_{avg}$ represent an engine speed averaged over at least one full engine cycle, its value might be determined over multiple engine cycles.

The tooth detector 28 supplies its corresponding tooth signal to the signal processing circuitry 32 via line 44. As with the TDC counter 38, a TOOTH INTERVAL TIME COUNTER 46 is driven by a REFERENCE CLOCK$_2$ in block 48 and of predetermined frequency, as for instance, 25 MHz, to measure the time interval between selected teeth on flywheel 18. Appropriately programmed circuitry 50 operates in conjunction with an indication of the TDC reference, REF, to control counter 46 such that only a pair of adjacent teeth which bracket a crank angle of interest are permitted to respectively stop and start the counter 46. The output of counter 46 is represented on line 52 as being a measure of the time between the pair of selected teeth 20 of known angular separation and is accordingly extended to block 54 where it is translated to an instantaneous sub-cyclic speed, $N_i$, which is available for further use in circuitry 32, as represented on line 56. Selected values of instantaneous speed, $N_i$, are adjusted as previously described and as represented by block 58. Following adjustment, the instantaneous speed values, $N_i$, represented on line 60 are then available for the calculation of instantaneous or average instantaneous speed difference, $\Delta N_i$, for each cycle as represented by block 62. The resulting signal appears on line 64 as $\Delta N_i$.

Figure 7:
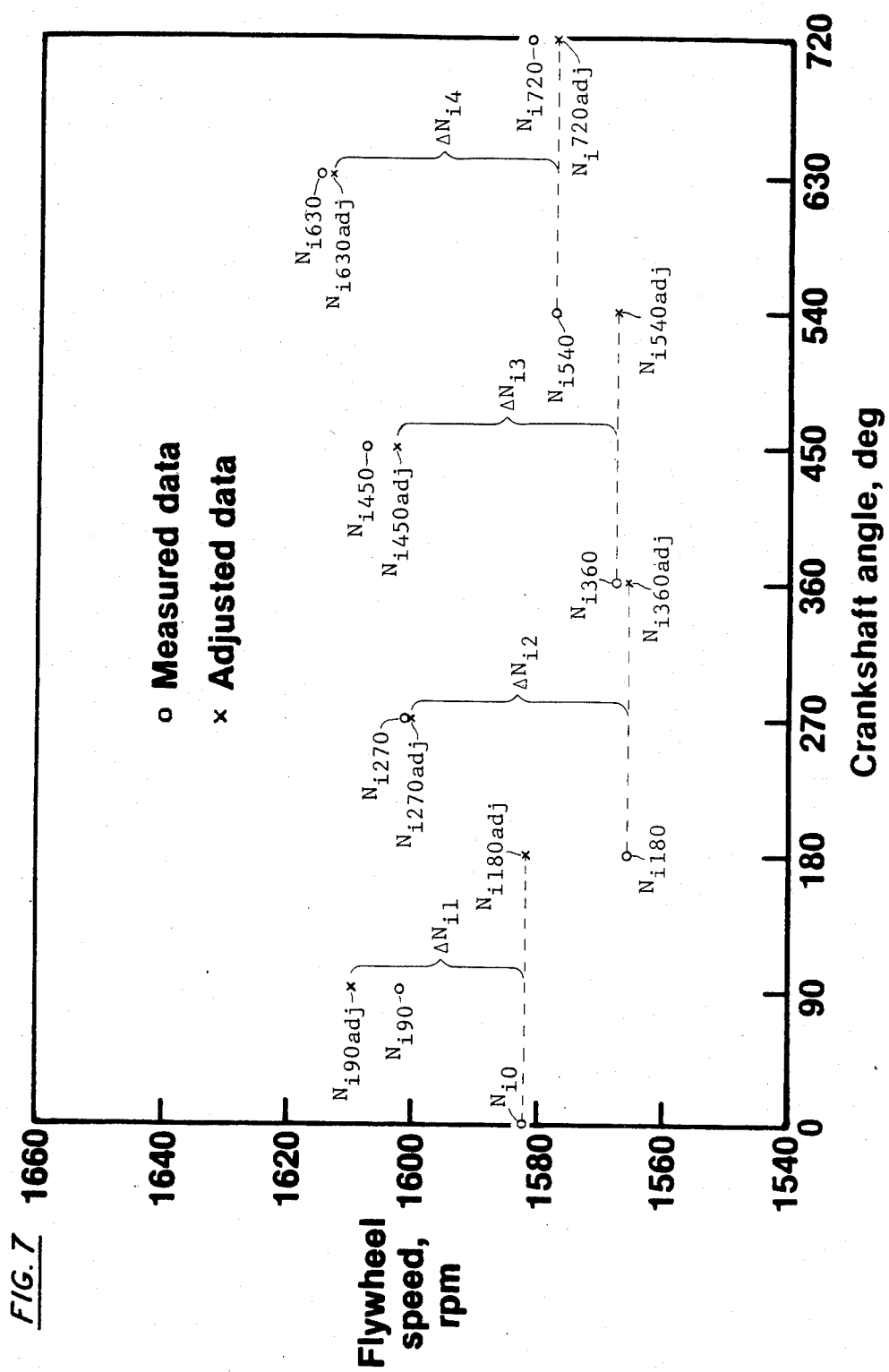
FIG. 7 is an illustration related to FIG. 3 and showing a plot of only the speed data required to practice the invention during normal operation.

The process of function blocks 50, 54, 58 and 62 of FIG. 6 will be better understood in view of the following discussion with reference to FIG. 7. While the plot of measured and adjusted data points in FIG. 3 included a relatively large number of data points for analytical and empirical purposes, FIG. 7 represents only those instantaneous speed data necessary to develop a torque signal for use during normal engine operation in accordance with the invention. As mentioned, each firing interval is of constant angular duration and fixed angular positioning relative to the rotation of crankshaft 14 and flywheel 18. Thus, in the four-cycle, four-cylinder engine 10, a first firing interval extends from zero to 180°, the second from 180° to 360°, the third from 360° to 540°, and the fourth interval from 540° to 720°. To adjust the measured instantaneous speed data for low frequency changes in engine speed, it is necessary to measure instantaneous speed at the beginning and end of each interval, i.e., $N_{i0}$, $N_{i180}$; $N_{i180}$, $N_{i360}$; $N_{i360}$, $N_{i540}$; and $N_{i540}$, $N_{i720}$. From these measured instantaneous speeds, the adjusted end-interval speeds $N_{i180adj}$, $N_{i360adj}$, $N_{i540adj}$ and $N_{i720adj}$ may be calculated.

The instantaneous speed differential for each of the firing intervals is determined by measuring the speed difference between two instantaneous speed data points spaced by one-half of a firing interval, i.e., by 90°, within the respective firing interval. This is most conveniently accomplished in the present invention by measuring instantaneous speed at the midpoint of each of firing intervals, i.e., $N_{i90}$, $N_{i270}$, $N_{i450}$ and $N_{i630}$. These mid-interval instantaneous speed data must then be adjusted, as previously described, to provide $N_{i90adj}$, $N_{i270adj}$, $N_{i450adj}$ and $N_{i630adj}$. The differential is then obtained by subtracting the instantaneous speed at either the beginning or the end of the interval (adjusted to be equal to one another) from the adjusted instantaneous speed at the middle of the interval. Accordingly, the difference in relevant instantaneous speeds for each of the firing intervals is graphically depicted by the bracketed amplitudes or magnitudes designated $\Delta N_{i1}$, $\Delta N_{i2}$, $\Delta N_{i3}$ and $\Delta N_{i4}$ for the first, second, third and fourth firing intervals respectively.

It is preferable that the speed differentials for each of the firing intervals be averaged over at least one full engine operating cycle to provide an average speed differential, $\Delta N_i$, which is provided for each 720° of rotation of crankshaft 14. Using the values of average engine speed, $N_{avg}$, provided each engine cycle and the values of $\Delta N_i$ provided each engine cycle, a signal representative of the engine output torque, T, appearing on line 25, is calculated using the generalized correlation equation $T = aN_{avg} + b\Delta N_i + c(N_{avg})^2 + d(\Delta N_i)^2 + e(N_{avg})(\Delta N_i) + f$, as represented by the function block 66.

The values of coefficients a, b, c, d, e, and f will have been preentered or preprogrammed, as discussed. Although the torque signal T is illustrated and described as representing the product of one full cycle of engine operation and can be updated each engine cycle, it may be more appropriate to provide a running average of torque T, which is averaged over a number of engine operating cycles and which can also be updated less frequently than every engine cycle.

The torque signal T from processing circuitry 32 is typically in digital form and may remain in that form for input to appropriate digital control and/or analytical circuitry associated with engine 10 and/or the associated vehicles, as represented by electrical utilization device 27 in FIG. 1. The digital signal T may also be converted to analog form if required.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by Letters Patent of the United States is:

1. Apparatus for providing a measure of the torgue of an internal-combustion engine having a rotating crankshaft for connection to a load, the crankshaft undergoing acceleration/deceleration sub-cycles associated with respective firing intervals within an engine cycle, comprising:

means for providing electrical signals indicating occurrence of particular angular positions of the crankshaft in an engine cycle;

electronic signal processing means responsive to said signals indicative of a crankshaft angle for providing signals, $N_i$, indicative of instantaneous sub-cyclic engine speed at each of a plurality of predetermined crankshaft angles in an engine cycle, said plurality of predetermined crankshaft angles including a respective pair of angles for each said firing interval, the respective two crankshaft angles of each said pair being spaced from one another by an angle corresponding with substantially one-half of a firing interval, for providing in response to said sub-cyclic engine speed signals, $N_i$, further signals, $\Delta N_i$, representative of the average of the difference between instantaneous engine speeds of the two crank angles of each respective said pair of crankshaft angles within an engine cycle, for providing signals, $N_{avg}$, indicative of average engine speed, and for generating a torque signal, T, as a function of said average engine speed signal, $N_{avg}$, and said average instantaneous engine speed difference signal, $\Delta N_i$; and electrical utilization means having said torque signal, T, operatively connected as an input thereto.

2. The torque measuring apparatus of claim 1 wherein said torque signal T, is determined principally in accordance with the specific relationship $T = aN_{avg} + b\Delta N_i + c(N_{avg})^2(\Delta N_i) + d$, where a, b, c and d are predetermined constants.

3. The torque measuring apparatus of claim 1 wherein said torque signal T is determined in accordance with the general relationship $T = aN_{avg} + b\Delta N_i + c(N_{avg})^2 + d(\Delta N_i)^2 + e(N_{avg})(\Delta N_i) + f$, where a, b, c, d, e and f are predetermined constants.

4. The torque measuring apparatus of claim 1 wherein said engine has multiple cylinders and includes a plurality of substantially symmetrical firing intervals within an engine cycle.

5. The torque measuring apparatus of claim 4 wherein said average engine speed signal, $N_{avg}$, is representative of the average engine speed for at least one engine cycle.

6. The torque measuring apparatus of claim 5 wherein each said pair of predetermined crankshaft angles comprises a first crankshaft angle which corresponds substantially with the mid-point of a respective firing interval and a second crankshaft angle which corresponds substantially with either the beginning or the end of the same respective firing interval.

7. The torque measuring apparatus of claim 1 wherein each said pair of predetermined crankshaft angles comprises a first crankshaft angle which corresponds substantially with the mid-point of a respective firing interval and a second crankshaft angle which corresponds substantially with either the beginning or the end of the same respective firing interval.

8. The torque measuring apparatus of claim 7 wherein said signal processing means is responsive to a difference in said sub-cyclic engine speed signals, $N_i$, occurring at the beginning and at the end of a firing interval for adjusting the values of $N_i$ for the respective firing interval.

9. The torque measuring apparatus of claim 4 wherein said engine is a compression ignition engine and the start of the first of said firing intervals corresponds with top dead center of the crankshaft for the number 1 cylinder.

10. The torque measuring apparatus of claim 9 wherein said engine is a four-cycle engine and said start of said first of said firing intervals corresponds with top dead center of the crankshaft at the start of the power stroke for the number 1 cylinder.

11. The torque measuring apparatus of claim 1 wherein said means for providing signals indicating the occurrence of particular angular positions of the crankshaft in an engine cycle include first means for sensing a reference angular position of the crankshaft and second means for sensing multiple other angular positions of the crankshaft, said other angular positions being referenced to said reference angular position.

12. In a method for providing, to electrical utilization means, a torque signal of the internal combustion engine having a rotatable crankshaft for connection to a load, the crankshaft undergoing acceleration/deceleration sub-cycles associated with respective firing intervals within an engine cycle, comprising the steps of:

sensing the rotation of the engine crankshaft and providing electrical signals, $N_{avg}$, indicative of average engine speed and electrical signals, $N_{min}$, representative of instantaneous sub-cyclic engine speed at each of a plurality of predetermined crankshaft angles within an engine cycle, said plurality of predetermined crankshaft angles including a respective pair of angles for each said firing interval, the respective two crankshaft angles of each said pair being spaced from one another by an angle corresponding with substantially one-half of the included angle of a firing interval;

providing further electrical signals, $\Delta N_i$, representative of the average of the difference between instantaneous engine speeds of the two crankshaft angles of each respective said pair of crankshaft angles within an engine cycle;

generating an electrical torque signal T as a function of said average engine speed signal $N_{avg}$ and said average instantaneous engine speed difference signal $\Delta N_i$; and applying said torque signal T as an input to the electrical utilization means.

13. The method of claim 12 wherein said torque signal T is determined in accordance with the general relationship $T = aN_{avg} + b\Delta N_{avg} + c(N_{avg})^2 + d(\Delta N_i)^2 + e(N_{avg})(\Delta N_i) + f$, where a, b, c, d, e and f are predetermined constants.

14. The method of claim 12 wherein each said pair of predetermined crankshaft angles comprises a first crankshaft angle which corresponds substantially with the mid-point of a respective firing interval and a second crankshaft angle which corresponds substantially with either the beginning or the end of the same respective firing interval.

15. The method of claim 14 wherein said engine has multiple cylinders and includes a plurality of substantially symmetrical firing intervals within an engine cycle.

16. The method of claim 15 wherein said average engine speed signal, $N_{avg}$, is representative of the average engine speed for at least one engine cycle.

17. The method of claim 15 including the steps of adjusting at least some of the values of said instantaneous sub-cyclic engine speed signals, $N_i$, for a said firing interval in response to determining that a difference exists between said instantaneous engine speed signals occurring at the beginning and at the end of the respective said firing interval.

* * * * *